Dec. 26, 1933.  D. W. HICKEY  1,940,910
FLANGE CLAMP FOR WELDING
Filed Oct. 15, 1931   2 Sheets-Sheet 1

Inventor
Daniel W. Hickey
By Stryker & Stryker
Attorneys

Dec. 26, 1933. D. W. HICKEY 1,940,910
FLANGE CLAMP FOR WELDING
Filed Oct. 15, 1931 2 Sheets-Sheet 2
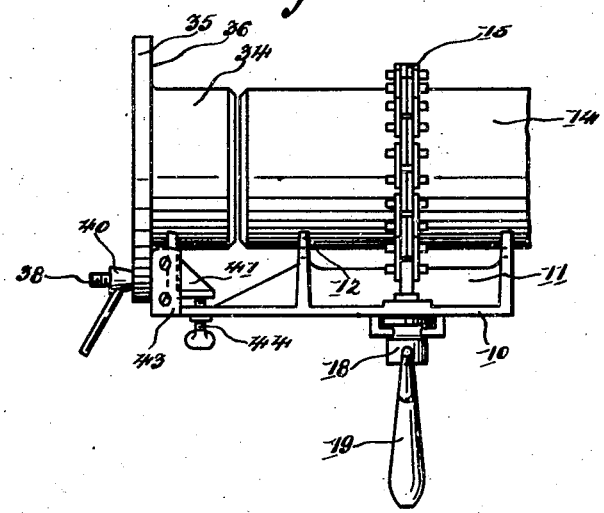
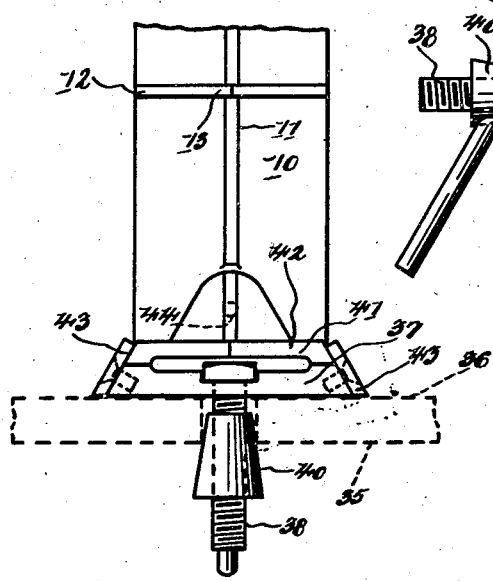
Inventor
Daniel W. Hickey
By Stryker & Stryker
Attorneys Patented Dec. 26, 1933

1,940,910

UNITED STATES PATENT OFFICE 1,940,910

FLANGE CLAMP FOR WELDING

Daniel W. Hickey, St. Paul, Minn.

Application October 15, 1931. Serial No. 569,105

12 Claims. (Cl. 113—102)

It is the object of this invention to provide a novel clamp for holding a neck flange in proper alignment with a pipe to which it is to be welded during the welding or tacking preparatory to final welding.

Another object is to provide a clamp for temporarily holding the face of a flange at a fixed angle to the axis of a pipe to which the flange is to be welded and for actuating the flange relative to the pipe, while so held, to a position in exact axial alignment with the pipe.

A further object is to provide a clamp of this kind adapted for use with pipes and flanges of widely different sizes, the device being designed for quick and easy attachment and having means for properly aligning the axis of a neck flange of any of a number of sizes with the axis of a pipe of the corresponding size.

The invention also includes certain other novel features of construction which will be more fully pointed out in the following specification and claims.

Referring to the accompanying drawings.

Figure 1:
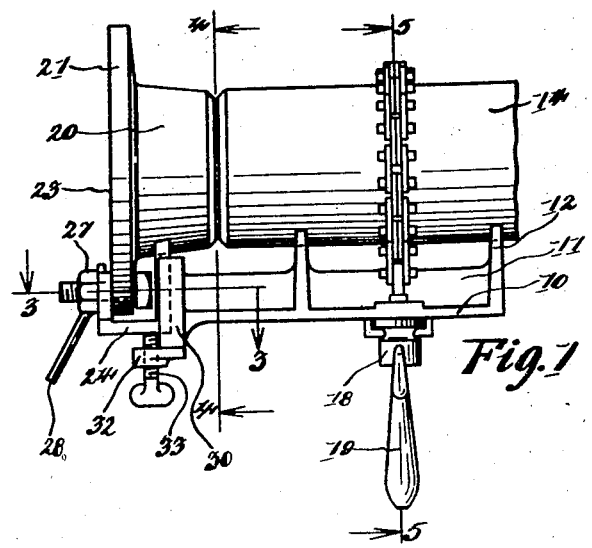
Figure 1 is a side elevation of the preferred form of my device, showing a pipe and neck flange in aligned position thereon.
Figure 5:
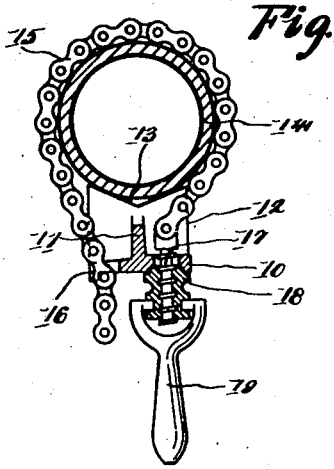
Figure 4:
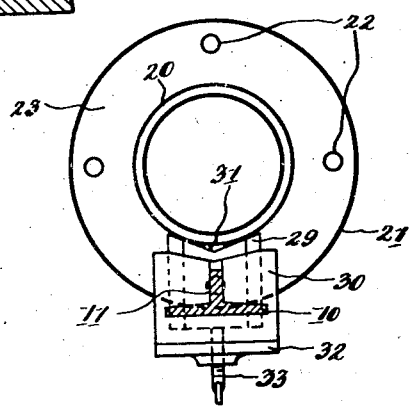
Figure 3:
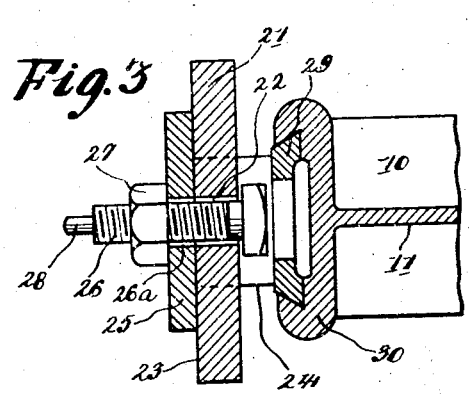
Fig. 3 is a fragmentary, horizontal section taken on the line 3—3 of Fig. 1.

Figs. 4 and 5 are sections taken respectively on the lines 4—4 and 5—5 of Fig. 1;

Fig. 6 is a side elevation showing an alternate form of my device with a flange and pipe in position thereon;

Fig. 7 is a fragmentary, longitudinal section through a bottom, end portion of the device shown in Fig. 6, and Fig. 8 is a plan view of the alternate form of neck flange holder and adjacent portions of the main frame.

The device has a main casting or frame consisting of a flat base plate 10, reinforced by a central rib 11 and having upstanding flanges 12 formed with V-shaped, aligned seats 13 for straight pipes 14. A chain 15 is provided to engage the periphery of the pipe 14 and hold it firmly on the seats 13. Projecting portions of the chain 15 are arranged to be placed in engagement with claw members 16 formed on the plate 10 and having a slot between them to freely receive the chain 15. These claw members 16 are arranged to engage any of a number of the links of the chain 15 depending on the diameter of the pipe 14 to be held. One end of the chain 15 is secured to a screw 17 which passes through an opening in the base plate 10 and is threaded in a nut 18 engaging the bottom of the said plate. To facilitate turning the nut 18, a handle 19 is pivotally connected thereto.

The device has a clamp for holding a neck and integral flange 21 in proper position for welding to an end of the pipe 14. The flanges 21, in commercial use, have a series of perforations 22 to receive bolts for securing a machined face 23 of the flange in engagement with a gasket on the end of a flanged section of pipe or fitting.

In the preferred form of my device, a U-shaped casting 24 has a member 25 arranged to be secured to the face 23 of the flange 21, the surface of the member 25 for engagement with the face 23 being plane and smooth and extending at right angles to the axis of the pipe 14 on the seats 13. A bolt 26 is provided for insertion in one of the perforations 22 in the flange 21, with the head of the bolt engaging the back of said flange and the shank of the bolt extending through an elongated opening 26a in the member 25. A nut 27, preferably provided with a rigid handle 28, is threaded on the end of the bolt 26 which projects from the member 25.

Figure 2:
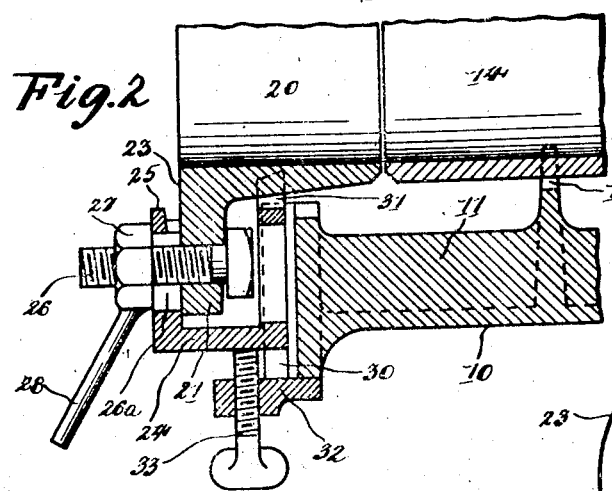
Fig. 2 is a fragmentary, central longitudinal section through the lower portions of the device, flange and pipe near one end.

Another member 29 of the casting 24 extends in parallel relation to the member 25 and is of dovetail shape in cross section to engage a similarly shaped guide 30 formed on the end of the main casting. The guide 30 has machined ways to slidably receive the member 29 and permit movement of said member in a plane perpendicular to the axis of a pipe secured to the seats 13. The member 29 projects from an open end of the guide 30 and is formed with a V-shaped seat 31 to engage the periphery of the neck 20. As best shown in Figs. 2 and 4, this seat 31 is similar to the seats 13 on the flanges 12 and has contact surfaces for the neck 20 symmetrically disposed relative to the central vertical, longitudinal plane through the device. A lug 32 is rigidly secured to the normally lower end of the guide 30 and has a tapped hole to receive a screw 33. The upper end of the screw 33 is arranged to engage the casting 24 so that by turning said screw said casting may be actuated along the guide 30.

In use, when a neck flange is to be secured to the end of a pipe 14 by welding, the U-shaped casting 24 may be placed with the face 23 abutting the inner, plane surface of the member 25, as shown in the drawings, Figs. 1 to 4. The bolt 26 is then passed through one of the holes 22 in the flange 21 and the member 25 is secured to the face 23 of the flange by applying the nut 27. The member 29 is next placed in the guide 30 and the pipe 14 is supported on the flanges 12 in such position that the end of the pipe to be welded is in the desired close proximity to the neck 20. As the next operation, the chain 15 is applied and tightened to rigidly hold the pipe 14 in fixed position on the main frame. Finally the screw 33 is manipulated to actuate the neck flange to such position that its axis is in proper alignment with the axis of the pipe 14. The welding operation may now be performed to connect the abutting ends of the nipple and pipe. This welding is usually performed in two steps, the first of which consists in tacking the nipple to the pipe at spaced points around the periphery and the second or final welding being performed after removing the rigidly joined pipe and neck flange from the clamp.

The V-shaped seats 13 and 31 are designed to receive pipes of widely different sizes and the member 25 is formed to be secured to flanges of corresponding sizes. As best shown in Fig. 2, the opening 26a for the bolt 26 is elongated to permit insertion of the bolt 26 in flanges 21 having the perforations 22 spaced differently relative to their outer peripheries.

In the alternate form of my device shown in Figs. 6, 7 and 8, the elements for securing the main casting or frame to the pipe 14 are similar to those above described, but a different mechanism is provided for attachment to a neck 34 having a flange 35 somewhat different from the flange 21 shown in Fig. 1. This flange 35 has a back surface 36 to which a member 37 of the device is secured by a bolt 38. The member 37 is integral with the main casting and has a flat face to engage the surface 36. The bolt 38 is inserted through an elongated slot 39 formed in the member 27 and a nut 40 is threaded on the bolt 38 to engage the flange 35. Slidably connected to the member 37 is a member 41 having a V-shaped seat 42 in its upper surface similar to the seats 13 and 31. This member 41 is movable vertically or in a direction perpendicular to the axis of the nipple 34 and is guided by obliquely extending plates 43 secured to the lateral sides of the member 37. To actuate the member 41, a screw 44 is threaded in the main casting and has a normally upper end which engages said member.

In the use of the alternate form of my device, the flange 35 is placed in engagement with the outer surface of the member 37 while inserting the bolt 38 through a perforation in the flange. The nut 40 is then loosely applied to the bolt 38. The pipe 14 is secured on the seats 13 by applying the chain 15 in such position as to locate the end of the pipe 14 at the desired position relative to the end of the neck 34. Assuming that the plate 10 is in horizontal position, this secures the pipe 14 in such position that a continuation of its axis is in parallel relation to, and in the same vertical plane with, the axis of the neck 34. To finally align the axis of the neck with that of the pipe, the screw 44 is turned in the appropriate direction while the nut 40 is allowed to remain loose enough to permit the bolt 38 to move in the slot 39. When the neck and pipe are in proper axial alignment, the nut 40 may be tightened and the neck flange may be tacked or welded to the pipe 14.

It will now be understood that in each of the illustrated forms of my device, the element which engages the pipe flange is so arranged as to retain the face of the flange in perpendicular relation to the axis of the pipe held by the chain and the elements for engaging the periphery of the neck (at spaced points on its periphery) are so arranged that when said elements are brought into engagement with the neck the latter is moved to such position that its axis is parallel to the axis of the pipe and in the same central longitudinal plane therewith. The neck flange is then movable relative to the pipe in such direction as to bring its axis in accurate alignment with that of the pipe.

Having described my invention, what I claim as new and desire to protect by Letters Patent is:

1. A device of the class described comprising a seat for a pipe, means for securing a pipe on said seat, a second seat for a flanged member connected to said first mentioned seat and having a plane surface perpendicular to the axis of a pipe on said first mentioned seat for contact with a face of said flanged member and means for securing a flanged member on said second seat.

2. A device of the class described comprising a seat for a pipe, means for securing a pipe on said seat, a second seat for a flanged member connected to said first mentioned seat and having a plane surface for contact with a plane face of a flanged member and means for securing a flanged member on said second seat.

3. A clamp for holding a flanged member in fixed relation to a pipe comprising a seat for a pipe, means for securing a pipe on said seat and means for securing a flanged member at a fixed angle to a pipe on said seat, said last mentioned means having a plane surface for contact with a plane face of said flanged member to determine the angular position of said member relative to the pipe.

4. A device of the class described comprising a seat for the periphery of a pipe, means for securing a pipe on said seat, a second seat for the periphery of a flanged member, a member having a plane surface for contact with a plane face of said flanged member and means for securing a flanged member in contact with said plane surface.

5. A clamp for holding a flanged member in fixed relation to a pipe comprising a seat for the periphery of a pipe, means for securing a pipe on said seat, a holder for a flanged member, a guide engaging said holder and confining the same to movement at right angles to the axis of a pipe on said seat and means for centering a flanged member on said holder.

6. A device of the class described comprising a seat for pipes of different sizes, means for securing a pipe on said seat, said means being ajustable to engage pipes of different sizes, a second seat for a flanged member connected to said first mentioned seat and adapted to receive flanged members of different sizes, said second seat having a plane surface for contact with faces of the flanges to determine the angular position of said flanged members relative to a pipe on said first mentioned seat and means for securing a flanged member on said second seat.

7. A device of the class described comprising a seat for pipes of different sizes, means for securing a pipe on said seat, said means being adjustable to engage pipes of different sizes, a second seat for a neck flange connected to said first mentioned seat and adapted to receive neck flanges of different sizes, said second seat having a plane surface perpendicular to the axis of a pipe on said first mentioned seat for contact with a face of a flange and means for securing any of a number of neck flanges of different sizes on said second seat.

8. In a device for holding a flanged member in axial alignment with a pipe, a rigid frame, means for securing a pipe on said frame, a flange holder having a plane surface disposed in fixed angular position relative to the axis of said pipe, means for securing the face of a flange on said member against said surface, means for centering a flanged member on said holder relative to a pipe secured to said frame and a guide for said centering means permitting movement of the same transverse the axis of said pipe.

9. In a device for holding a flanged member in axial alignment with a pipe, a rigid frame, means for securing a pipe on said frame, a flange holder having a plane surface perpendicular to the axis of said pipe, means for securing the face of a flange on said member against said surface, means for centering the axis of a flanged member on said holder in parallel relation to the axis of a pipe secured to said frame and a guide for said centering means permitting movement of the same transverse the axis of said pipe.

10. In a device of the class described, a rigid frame, means for securing a pipe on said frame, a flange holder, means movably connecting said flange holder to said frame, means on said holder for retaining the face of said flange in predetermined angular position relative to the axis of said pipe, means for centering a flange on said holder to retain the axis of the same in parallel relation to the axis of said pipe and means for actuating said holder transverse the axis of said pipe.

11. A clamp for securing a neck flange in position for welding to a pipe comprising a rigid frame, a pair of aligned, V-shaped seats adapted to engage the periphery of a pipe at points spaced on its periphery and also spaced longitudinally thereof, means for securing a pipe in engagement with said seats, a flange holder secured to an end of said frame and having a plane surface for engaging a plane face of a neck flange, means for securing a neck flange in contact with said surface, a third seat for the periphery of a neck flange associated with said holder, said third seat being V-shaped and arranged to center a neck flange relative to a longitudinal center plane through said first mentioned seats and a guide for movement of said third seat transverse the axis of a pipe on said pair of seats.

12. A clamp for securing a neck flange in position for welding to a pipe comprising a rigid frame, a pair of aligned, V-shaped seats adapted to engage the periphery of a pipe at points spaced on its periphery and also spaced longitudinally of the pipe, means for securing a pipe in engagement with said seats, a flange holder movably secured to an end of said frame and movable vertically thereon, a member of said holder spaced from said frame and having a plane inner surface for engaging the outer face of a neck flange, means for securing a neck flange in contact with said surface, a seat for the periphery of a neck flange on said holder, said seat being V-shaped and arranged to engage a neck flange at points equally spaced on its periphery from a longitudinal center plane through said first mentioned seats and means for actuating said holder to center the axis of a neck flange with a pipe on said first mentioned seats.

DANIEL W. HICKEY.